Patented Feb. 13, 1940

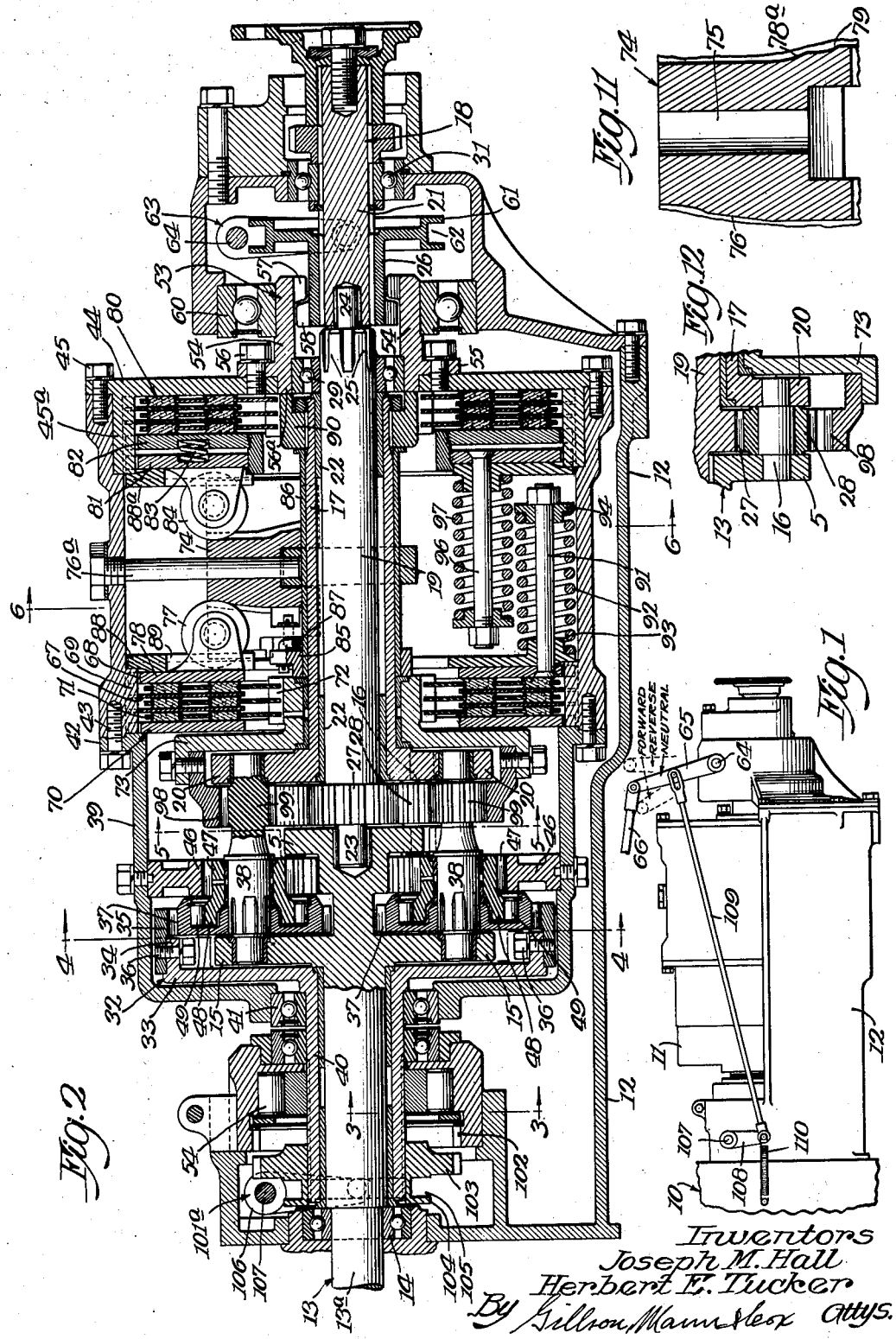

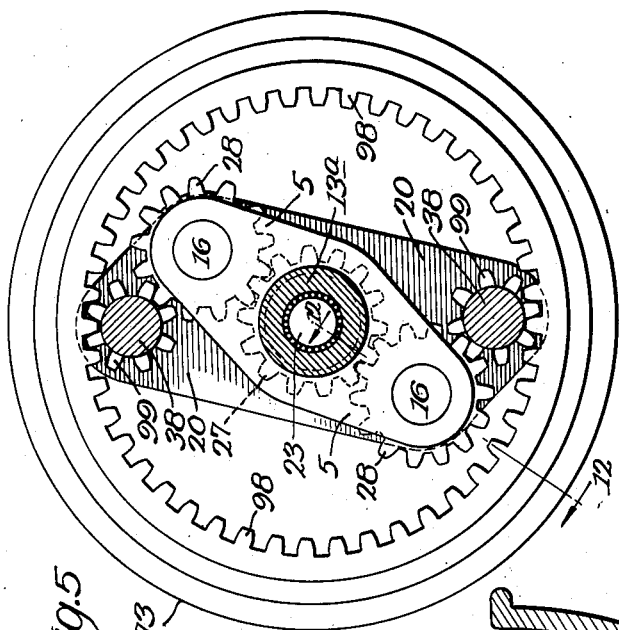
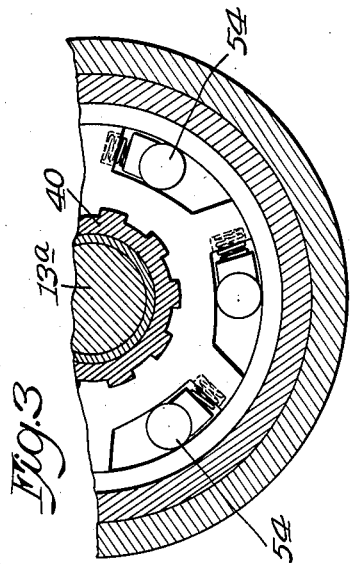
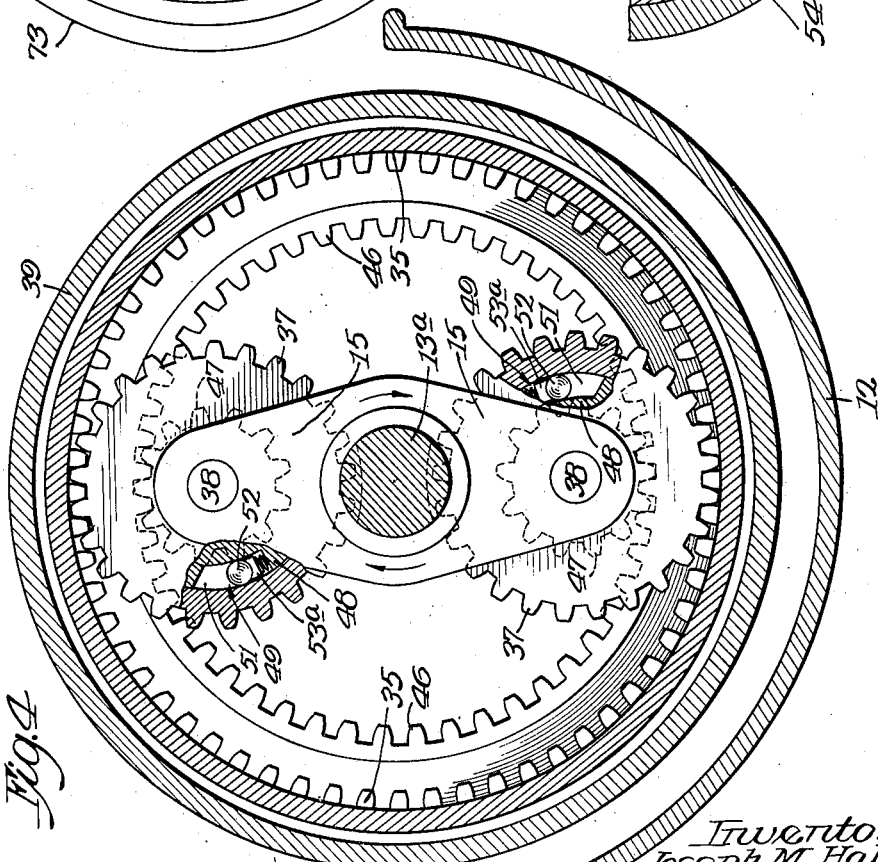

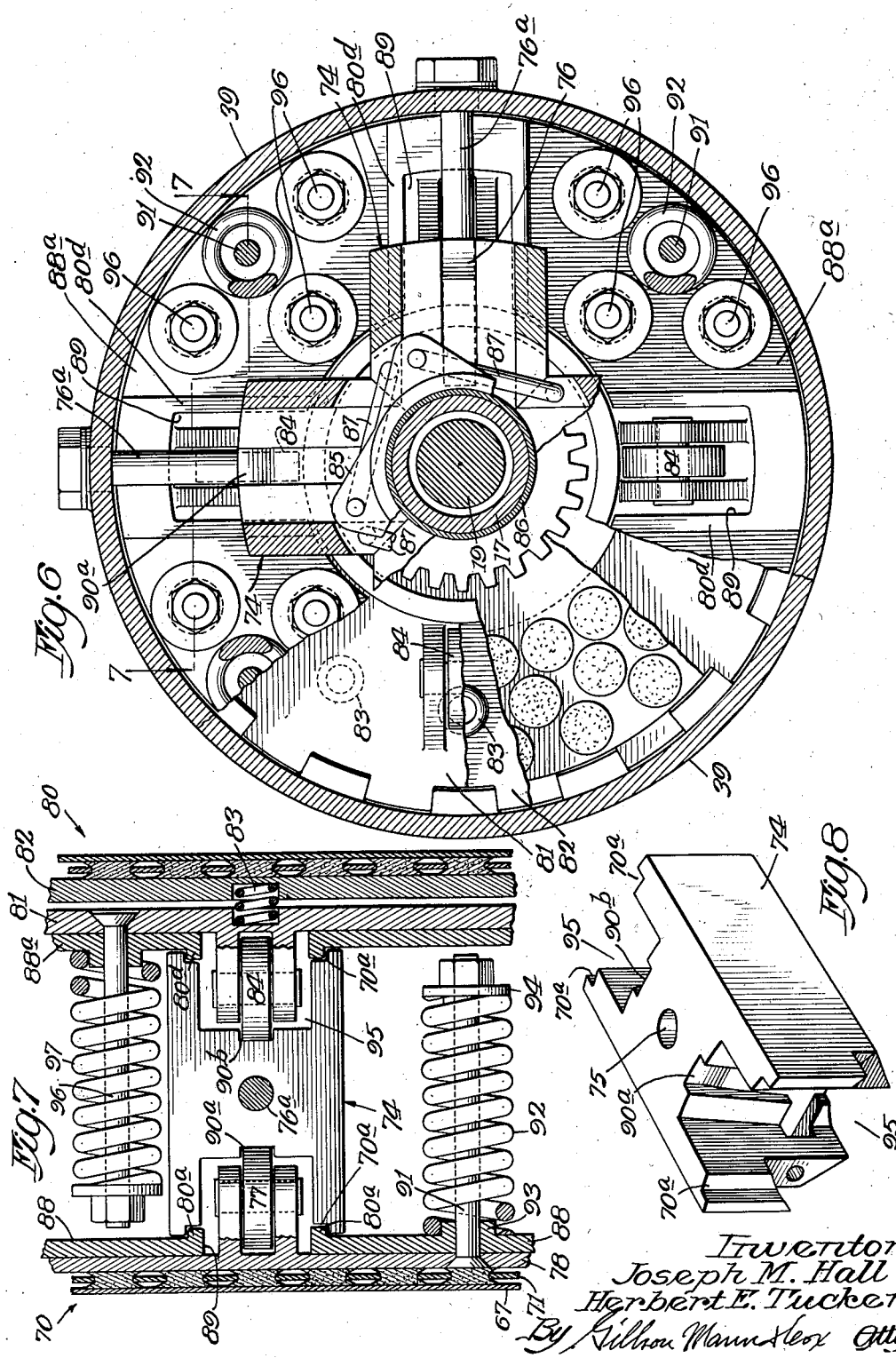

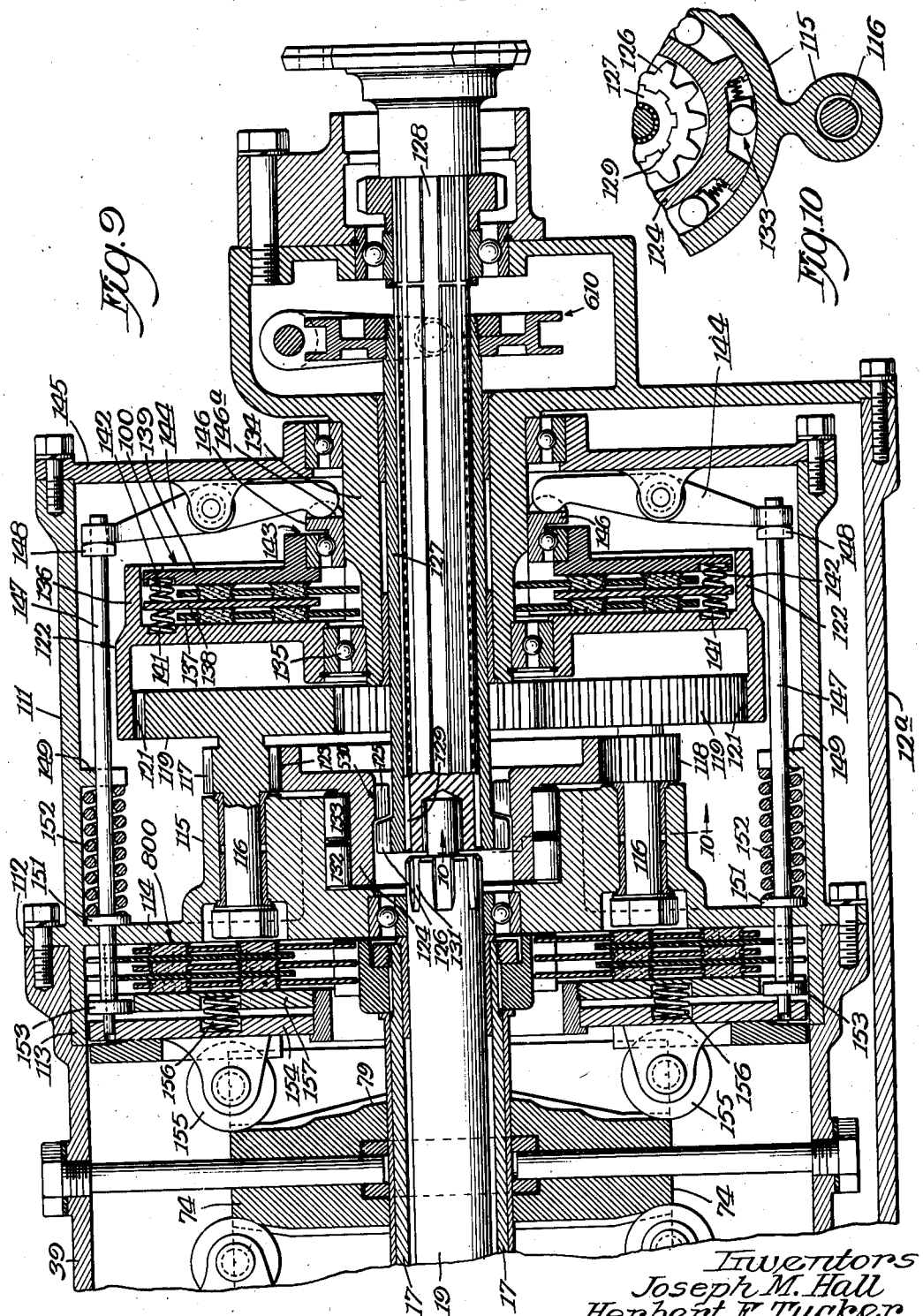

2,189,794

UNITED STATES PATENT OFFICE 2,189,794

CHANGE SPEED GEARING

Joseph M. Hall and Herbert E. Tucker,
Chicago, Ill.

Application August 8, 1935, Serial No. 35,328

14 Claims. (Cl. 74—260)

This invention relates to change speed mechanism, and more particularly to change speed mechanism for vehicles and the like.

One of the objects of the invention is the provision of a new and improved change speed gearing that is so constructed that it will automatically change from low speed to a plurality of higher speeds without disengagement of any intermeshing gears.

Another object of the invention is the provision of new and improved reverse mechanism in connection with an automatic change speed device in which the entire mechanism is housed within one casing.

Another object of the invention is the provision of a change speed mechanism in which the lower speeds are obtained by the use of differential movements in an internal gear mechanism.

A further object of the invention is the provision of a new and improved automatic change speed mechanism in which only one lever is required to be manually operated for the conventional forward speeds and reverse.

A still further object of the invention is the provision of a new and improved over-drive speed attachment that is adapted to be connected to an automatic change speed mechanism and which is automatic in its operation.

A still further object of the invention is the provision of a new and improved change speed mechanism that is simple in construction, composed of comparatively few parts; occupies a minimum space; which is adapted to have an overdrive speed attachment applied thereto; and that is efficient in operation and rugged in construction.

Other and further objects and advantages will occur as the description proceeds. While only one form of construction is disclosed, it is understood that this is for the purpose of illustration and that the following claims are to be construed as broadly as the state of the art will permit.

On the drawings:

Fig. 1 is a side elevation of an internal combustion engine with the invention in position thereon and which is especially adapted for use in an automobile or like vehicle;

Fig. 2 is a vertical section of the change speed mechanism;

Fig. 3 is a section on the line 3—3 of Fig. 2;
Fig. 4 is a section on the line 4—4 of Fig. 2;
Fig. 5 is a section on the line 5—5 of Fig. 2;
Fig. 6 is a section on the line 6—6 of Fig. 2;
Fig. 7 is a section on the broken line 7—7 of Fig. 6;

Fig. 8 is a perspective view of the centrifugal weight member used in the clutches;

Fig. 9 is a vertical section of a portion of the change speed mechanism disclosing an additional change speed device;

Fig. 10 is a section on the broken line 10—10 of Fig. 9;

Fig. 11 is a vertical section through one of the clutch weights;

Fig. 12 is a section on the line 12—13 of Fig. 5.

Referring now to Fig. 1 of the drawings, the reference character 10 designates an automobile having thereon the change speed mechanism 11. This mechanism comprises a stationary outer casing 12 (see Figs. 1 and 2) within which the mechanism is housed. This casing is adapted to be attached to the chassis in any suitable manner. Referring now to Fig. 2 of the drawings, the power shaft is shown at 13, the forward section 13—a of which is journaled in the forward end of the housing or casing 12 by any suitable means, as by anti-friction bearing 14.

The shaft section 13—a is provided adjacent its rear end with gear supporting arms or flanges 15 and at its rear end with a plurality of gear supports or arms 5. The arms 5 are rigidly connected, as by means of pins 16 (see Fig. 12) to corresponding gear supports or arms 20 integral with or rigidly connected to a sleeve 17. The shaft section 13—a and sleeve 17 being rigidly connected together rotate as a single unit and for convenience may be termed the drive shaft 13, having the forward section 13—a and the rear section 17. The driven shaft 18 is in two sections—a forward section 19 and rear section 21 which are adapted to be clutched together, as will presently appear. The shaft section 19 extends through and is rotatably mounted in bushings 22 secured in opposite ends of the sleeve 17. The forward end of the shaft section 19 is reduced as at 23 and is journaled in the rear end of the drive shaft section 13—a. At its opposite or rear end, the shaft section 19 has a reduced portion 24 which is journaled in the forward end of the shaft section 21 by roller bearings.

The end of the shaft section 19 adjacent the reduced portion 24 is provided with clutch teeth 25 which are adapted to interengage with corresponding teeth on the inner surface of a clutch sleeve 26 for reversing the change speed device, as will presently appear. The end of the shaft section 19 adjacent the reduced portion 23 is provided with a gear 27 rigidly secured thereto which is adapted to mesh with idler pinions 28 for reversing the direction of the driven shaft, as will be described more in detail later. These idler pinions are journaled on the pins 16. In addition to the bearings already described, the driven shaft 18 is provided with anti-friction bearings 29 and 31. The device shown in Fig. 2 is capable of three forward speeds, and one reverse.

First speed

Rotatably mounted on the rear portion of the drive shaft section 13—a forwardly of the arms 15 is a casing or a gear support 32. The gear support 32 has a sleeve portion 40 and a portion 33 extending radially which as shown is in the form of a disk having a laterally extending flange 34 to which a ring or internal gear 35 is rigidly connected, as by means of bolts 36. The ring gear 35 has internal teeth which mesh with a plurality of pinions 37 keyed to shafts 38, each of which is journaled in the arms 15 and 20 of the shaft section 13—a and sleeve 17, respectively. An outer gear support, which in the form of construction selected, illustrates one embodiment of the invention, is in the form of a casing 39 and is journaled on the sleeve portion 40 of the gear support 32, as by means of anti-friction bearings 41 at its forward end and by anti-friction bearings 60 at its rear end, as will presently appear. For convenience of assembly, this casing is in two sections, the forward end being provided with an annular flange 42 to which the edge of the rear portion may be attached, as by means of tap screws 43. This casing is hollow and the rear portion is closed by a plate 44, as by means of tap screws 45. This plate has a forwardly extending annular flange 45—a secured in a counter-bore in the rear end of the casing 39 and has internal ribs to which one set of the friction disks of the high speed clutch 80 is keyed, as will appear hereinafter.

Secured within the forward portion of this casing is an internal ring gear 46 of a less number of teeth than the ring gear 35. Pinions 47 rotatably mounted on the shafts 38 mesh with this gear. Each of these pinions is provided with a hub or extension 48 which extends into an annular recess in the gear 37. There is an overrunning clutch 49 between this extension and the outer wall of this recess. This clutch may be of any conventional form, that shown being of the roller and tapered slot type. As shown, the extension 48 is provided with a plurality of cutout portions which together with the inner surface of the annular recess of the pinion 37 form slots 51 (see Fig. 4) in which the rollers 52 are mounted.

The slot 51 is narrower at one end than at the other. The wider end of each slot is provided with a bearing 53—a which is spring-pressed against the roller for normally forcing the same toward the narrower end of the slot. By means of this arrangement the clutch will be prompt in its operation and all rollers will be effective when the clutch is in operation. It will be readily seen by an inspection of Fig. 4 that when the pinion 47 which rotates counter-clockwise overruns the pinion 37, the clutch will be operative to connect the two pinions and cause them to rotate together and will be released when the pinion 37 overruns the pinion 47.

An over-running type of brake 54 similar to the overrunning clutch just described is inserted between the forward end of the casing 12 and the sleeve extension 40 of the gear support or casing 32. This brake is so arranged that the sleeve 40 may not rotate backwardly—that is, it cannot move counter-clockwise while the shaft 13 is moving clockwise.

In the operation of the device, when the shaft 13 moves in the direction of the hands of a watch, that is, right-handed when viewed from the left in Fig. 2, which is the direction in which the power shaft of an internal combustion engine rotates, the same will rotate the arms 5 on the power shaft section 13—a and with it the arms 20 on the sleeve 17 since the two sets of arms are rigidly connected togethed by the pins 16. The arms 5 and 20 will carry the shafts 38 clockwise, thus causing the pinions 37 to rotate in a direction contrary to the hands of a watch since they are in mesh with the internal gear 35. The reaction on the gear 35 will tend to cause the extension or sleeve 40 of the gear support or casing 32 to rotate counter-clockwise, but the over-running brake 54 will prevent this movement, and, consequently, the ring gear 35 will be held stationary. The movement of the pinions 47 will over-run the pinion 37, thus causing the over-running clutch 49 to lock the extension or hub 48 thereto and rotate with the pinion 37. The rotation of the pinion 47, which is in mesh with the internal gear 46, will cause the casing 39 to rotate clockwise, by the differential movement of the gears—that is, the gear ratio between the ring gear 35 and the pinion 37 being less than the gear ratio between the ring gear 46 and the pinion 47 upon each rotation of the power shaft 13, the ring 46, and with it the casing 39, will be advanced clockwise a portion only of its rotation.

As the casing 39 rotates, it will carry with it one element of the clutch 53.

The clutch 53 (see Fig. 2) comprises a cylindrical member or hub 54′ journaled in the bearing 60 and is provided with a flange 55 that is rigidly secured to the end 44 of the casing 39, as by means of bolts 56. It is provided with a hub 56—a which is received in a corresponding opening in the central portion of the plate or end wall 44 of the casing 39.

The outer end of the hub 54 is provided with internal clutch teeth 57 that are adapted to interengage corresponding clutch teeth 58 on a clutch sleeve member 26 which is slidably keyed to the driven shaft section 21. Anti-friction bearings 29 are inserted between the shaft section 18 and the cylindrical portion 54 of the clutch 53. The sleeve 26 has on its rear end a cylindrical clutch operating member 61 having a peripheral groove 62 which is adapted to be engaged by the clutch fork 63 for operating the clutch. The clutch fork is mounted on the clutch shaft 64 (see Fig. 1) to which is rigidly attached an arm 65 which in turn is connected to a clutch operating rod 66 extending into the body of the car, as is usual in such constructions. When the clutch is moved to operative position—that is, when the arm 65 is moved forwardly, clutch teeth 57 engage the teeth 58 and the drive is then from the casing 39 through the clutch to the driven shaft section 21 which is driven at a reduced speed.

Second speed

In passing from first to second speed, the change is effected by the operation of a centrifugal clutch mechanism which will now be described. Since the clutches 70 and 80 for second speed and/or third or high speed respectively, are operated by the same centrifugal device, both will be here described.

The clutches employed are of the multiple plate friction type and the second speed clutch 70 comprises a group of friction plates 67 which are provided with peripheral notches 68 which engage corresponding ribs 69 extending inwardly from the casing 39 and are intercalated with another group of plates 71 which have corresponding peripheral notches interlocking with ribs 72 fixed to a gear support 73 which is rotatably mounted on the sleeve 17. The plates 67 and 71 are of the usual or any well-known type and may be provided with pockets or openings on their contacting faces for containing friction material, in the usual manner.

Suitable means are provided for clamping the plates to cause the gear support 73 and the casing 39 to rotate together. In the form of the device selected to illustrate one embodiment of the invention, a plurality of weights 74 having suitable cam surfaces are provided for this purpose. The weights are each provided with an axial opening 75 (see Fig. 11) which is adapted to receive a guide rod 76—a which in turn is rigidly secured to the casing 39, as clearly shown in Fig. 2 of the drawings.

Each weight is slidably mounted on its corresponding rod 76—a and is provided with cam surfaces on opposite sides thereof which are adapted to be engaged by rollers that operate the clutches, as will presently appear. The cam surface 76 on one side is adapted to be engaged by a roller 77. The roller 77 is secured to the rearmost plate 78 of the second speed clutch for engaging the cam surface 76. The roller 84 engages the cam surface 78—a and 79 for operating the high speed and over-drive speed clutches, as will presently appear. The high speed clutch 80 is also within the casing 39 but is arranged on the opposite side of the weights 74 from the second speed clutch 70. This clutch is adapted to lock the casing 39 to a collar 90 keyed to the sleeve 17 for operating the driven shaft at the same speed as the driving shaft. The clutch is provided on its forward side with two comparatively thick plates 81 and 82 which are locked with the casing 39 and are separated by the springs 83. The plate 81 is slidable relative to the plate 82 and both are slidable as a unit toward the clutch plates for compressing the same. This arrangement will prevent injury to the clutch as a result of over-pressure thereon by the clutch operating mechanism and will also permit the operation of the over-drive clutch, as will presently appear.

The plate 81 is provided with the roller 84 which is adapted to engage the cam surface 78—a of the weight 74 for operating the clutch 80 and also is adapted to engage the cam surface 79 for operating the over-drive clutch mechanism when such mechanism is used.

The clutch operating weights 74 are adapted to move radially outward by centrifugal action. Any suitable number may be employed. In the form shown, which is by way of example only, four are used. These weights are guided by the rods and by the plates 88 and 88—a, which are fixed to the inner ends of the clutch housings and may be considered as constituting closure plates for the housings for the clutches 70 and 80. Each weight is grooved at opposite sides as at 95 (see Figs. 7 and 8) and the side walls of the grooves are rabbeted as at 70—a for receiving radial flanges 80—a and 80—d on the plates 88 and 88—a. Counter grooves 90—a and 80—b are provided for guiding the rollers. The cam surfaces 76, 78—a and 79 are formed in the bottom walls of these counter grooves.

In order that the weights which are thrown outwardly by centrifugal force shall move outwardly simultaneously, a collar 85 (see Figs. 2 and 6) is loosely mounted on a bushing 86 which extends about the sleeve 17. Links 87 are connected to this collar and to the weights in such a manner that as the weights move outwardly, the links will become more nearly radial, and as the weights move inwardly, the collar is rotated so that the links will take the position at an increasing greater angle to the axis of the weights, as clearly shown in Fig. 6. It will thus be seen that as any weight moves outward, it will rotate the sleeve, and if any weight sticks, it will be forced outward by the corresponding connecting link or rod 87.

Suitable means are provided for automatically releasing the clutch and for forcing the weights inwardly when the speed of the driven shaft decreases to a predetermined amount. In the form of the construction disclosed, this is accomplished by a plurality of helical springs for each clutch mechanism. In the clutch mechanism 70, the plate member 88 engages and interlocks with the outer end of the ribs 69 and is provided with a plurality of radial slots 89 through which the rollers 77 extend (see Fig. 7). Attached to the plate 78 are a plurality of rods 91 which extend through the plate 88 and have helical springs 92 mounted thereon. The outer side of the plate 88 may be provided with a plurality of bosses 93 for positioning the inner end of the springs 92. A spring cap 94 provided with a boss is adapted to position the outer end of each spring. The clutch member 80 is also provided with a similar plate 88—a through which extend a plurality of bolts or rods 96 which are attached to the plate 81 and have helical springs 97 surrounding the same for releasing the clutch as in the construction just described.

When the clutches are compressed due to the movement of the weights outwardly, the springs 92 and 97 will be compressed and when the speed decreases the pressure of the rollers on the cam surface will force the weights inwardly along the rod 76—a and simultaneously release the clutches.

The cam surface 76, as shown in Figs. 2 and 11, is abrupt at its inner end to form what may be termed a kind of barrier or pocket for receiving the roller 77 and preventing radial movement of the weight 74 until its speed exceeds a predetermined amount. When the speed of the weight exceeds this predetermined amount, it will suddenly move outwardly causing the roller 77 to ride up the abrupt portion of the incline onto the more acute inclined portion of the cam surface. When the roller engages the more moderate inclination, the effective action of the springs to cause the movement of the weight radially inwardly due to the camming action will be greatly reduced and since the weight has moved farther from the shaft, its angular velocity will be increased, the weight will, under these conditions, move outwardly rapidly to operate the clutch 70 for intermediate speed with substantially no slipping of the clutch members. The radial movement of the weight will be stopped by the engagement of the roller 84 with the abrupt inclined surface 78—a, Fig. 11. At this time the roller 77 will have engaged the inner portion of the cam surface 76 which is parallel with the clutch plates. When the velocity of the weights reaches a predetermined amount, the weight will suddenly move outwardly causing the roller 84 to move up the abrupt incline 78—a thereby operating the high speed clutch. The roller will be stopped by the abrupt inclined shoulder 79. Likewise, when the angular velocity of the weights exceeds a still further predetermined amount, the weight will suddenly move outwardly causing the roller to suddenly move over the abrupt inclined surface 79 and operate the fourth or overdrive speed clutch 80, as will presently appear. These features, or substantially the same, are disclosed and claimed in our copending application, Serial Number 121,387, filed January 21, 1937.

The gear support 73 has an internal gear 98 rigidly attached thereto and each of the shafts 38 are provided on their rear ends with pinions 99 keyed thereto and which mesh with the ring or internal gear 98.

In the operation of the device, after the speed has increased to such an extent that the weights are forced outwardly to operate the clutch 78, the gear support 73 and the casing 39 will be locked together.

As the power shaft 13 rotates, the pinion 37 will cause the rotation of the shaft 38 and with it the pinion 59. The pinion 99 will cause the forward rotation of the ring gear 98 and with it the casing 39 which will cause the pinion 37 to over-run the pinions 47 and release the over-running clutch 49. Since the gear ratio between the ring gear 98 and the pinion 99 is greater than that between the ring gear 35 and pinion 37, the ring gear 98 will be rotated with the hands of a watch, but at a less speed than the driving shaft 13; due to the difference in gear ratio, the casing 39 will be driven at a higher rate of speed than when the same is driven by the pinions 47.

*High speed*

On a further increase in the speed of the driven shaft 13, the weights 74 will move still farther radially outward due to centrifugal force until the rollers 84 come into contact with the cam surfaces 78—a when the said rollers will be forced rearwardly for compressing the clutch plates and through the clutches, locking the casing 39 directly to the sleeve 17. Since the sleeve 17 moves with the power shaft, the driven shaft 21 will be operated through the clutch 53 at the same speed as the driving shaft.

*Reverse speed*

In order to reverse the direction of the rotation of the driven shaft section 21, the clutch 53 must be released and the shaft sections 21 and 19 connected together. A plurality of idler pinions 28 are provided which are adapted to engage the gear 27 on the shaft section 19 and the pinions 99' for reversing the direction of rotation of the shaft sections 19 and 21. In order that the idler gears may operate, the casing or gear support 32 must be locked from rotation. This is accomplished by a clutch mechanism 101—a which comprises a stationary tooth member 102 which is adapted to be engaged by a tooth clutch member 103 which in turn is slidably mounted on the sleeve or extension 40 of the gear support 32 and is keyed thereto. The clutch member 103 is provided with a hub 104 (see Fig. 2) having a groove 105 which is adapted to be engaged by a gear operating fork 106 in the usual manner. The fork 106 is rigidly connected to the shaft 107 to which an arm 108 is rigidly connected (see Figs. 1 and 2).

The mechanism for operating the clutch 53 and that for operating the clutch 103 are interconnected in such a manner that when the arm 65 is moved rearwardly to the dotted line position shown in Fig. 1, the clutch will be released—that is, the clutch sleeve 26 will be moved forwardly to disengage the clutch teeth 57 and on further movement the movable member of the clutch 101—a will be moved rearwardly to cause the teeth of the clutch sections 102 and 103 to interengage. This is accomplished by the provision of a link 109 which is pivotally connected to the arm 108 at its forward end and is connected to the clutch arm 65 at its rear end by a pin and slot connection. A spring 110 normally holds the clutch 103 in released position. The parts are so arranged that when the arm 65 is in neutral position (as shown in Figs. 1 and 2), the arm 108 will also be in neutral position. The pin and slot connection permits the clutch arm 65 to move forwardly for operating the clutch 53 without affecting the clutch 101—a. Drive on reverse will be through the drive shaft section 13—a, the gear 27, ring gear 35, shafts 38, pinions 99, idlers 28 and the pinion 27 splined on the shaft 19.

The idlers will reverse the direction of rotation of the shaft 19 and with it the direction of rotation of the shaft section 21 which will be clutched thereto by the clutch sleeve 26 engaging the teeth 25 on the rear end of the shaft section 19. It will thus be seen that the entire change speed mechanism, including the reverse, is enclosed within a single casing and that in all forward speeds, the casing 39 rotates in the direction of the driving and driven shafts and that upon reverse, the casing does not rotate in either direction.

Furthermore, it will be noted that the first and second speeds are caused by a differential movement of pinions which engage internal gears and at high speed the driven shaft is driven in the same direction as the driving shaft and that the gears are all locked from rotation.

It is sometimes desirable to provide an overdrive or a fourth forward speed in which the driven shaft rotates at a higher speed than the driving shaft. This is accomplished by the mechanism which will now be described:

*Fourth or over-drive speed*

This mechanism is attached to the rear end of the casing 39 and does not require any changes in the mechanism previously described, except a slight modification in the clutch 80 and an increase in the length of the driven shaft section 21.

Referring now to Figs. 9 and 10, it will be seen that this mechanism comprises a casing 111 which is substituted for the end plate 44 of the casing 39, as shown in Fig. 2. The casing 111 is provided with a peripheral flange 112 whereby the same may be attached to the rear end of the casing 39, and has a forwardly projecting cylindrical portion 113 that fits within the outer end of the casing 39. The cylindrical portion 113 carries a clutch mechanism 80° which corresponds to the clutch 80. In the form of construction shown in Fig. 9, the forward end of the casing 111 is provided with an end plate 114 which has at its central portion a rearwardly extending hub 115 in which is rotatably mounted a plurality of shafts 116 each having keyed on the rear ends thereof a small pinion 117 and a large pinion 119, the latter of which meshes with a ring gear 121 integral with or rigidly attached to a clutch housing 122. The pinion 117 meshes with a spur gear 123 which has a forwardly extending hub 124 having an axial opening provided with clutch teeth 125 which are adapted to interengage with corresponding radially extending clutch teeth 126 on the inner end of a clutch sleeve 127.

The sleeve 127 is slidably mounted on the driven shaft section 128 and is splined to said shaft. The sleeve 127 is provided with inwardly extending clutch teeth or splines 129 which slidably engage corresponding recesses or grooves in the driven shaft section 128 and are also adapted to engage corresponding grooves 131 in the rear end of the driven shaft section 19 for connecting the two sections of the driven shaft together.

The rear end of the driven shaft section 19 is journaled in the forward end of the driven shaft section 128 and is similar to the construction previously described. The hub 124 of the gear 123 engages in a recess in the hub 115 and a roller bearing or other anti-friction bearing 132 is provided between the two hubs. An over-running clutch 133 (see Fig. 10) is also provided between the two hubs and is so constructed that when the hub 115 over-runs the hub 124, the over-running clutch will lock the two to cause them to rotate, as in low, intermediate and high speeds, but when the hub 124 rotates at a greater speed than the hub 115, the over-running clutch will release, as in fourth or over-drive speed.

The clutch housing 122 is rotatably mounted on an inwardly extending sleeve portion 134 fixed to stationary casing 12—a, as by means of the anti-friction bearings 135. This housing is provided with a rearwardly extending annular flange 136 within which is mounted the corresponding disks 137 and 138 of a friction disk brake 100. The disks 137 are keyed to the sleeve 134 while the disk 138 is keyed to the annular flange 136. An annular plate 139 having a friction surface is provided for forcing the friction plates into frictional contact for operating the brake 100 to lock the ring gear 121 to the casing section 12—a. This plate is slidable inwardly along the sleeve 134 and is splined to the annular flange 136 of the clutch housing. Springs 141 and 142 are interposed between the friction plate 138 and the plate 139 and between the plate 138 and the bottom of the clutch housing 122, respectively. The plate 139 which is slidably splined to the clutch housing 122 is journaled on the sleeve 134 by means of a suitable anti-friction bearing 143 which is slidable along and rotatable on the sleeve 134. Suitable means are provided for actuating the brake 100. As shown, this is accomplished by a plurality of dogs or clutch arms 144 which are pivotally connected to the end plate 145 of the casing 111 which in turn constitutes a closure for the rear end of said casing. The inner ends of the dogs 144 engage a flange 146 between guide lugs 146—a on the anti-friction bearing 143 and are adapted to force the same inwardly to compress the clutch plates.

The outer ends of the dogs 144 are provided with openings into which the rear end of clutch operating rods 147 are adapted to engage. Nuts 148 on the rear end of the rods constitute shoulders or adjustable stops for limiting the movement of the rods 147 through said openings. The forward ends of the rods extend through guide flanges 149 on the casing 111 and are provided with collars 151 which constitute an abutment for springs 152 surrounding the rods 147 between the flange 149 and shoulders 151. The rods extend forwardly through the end plate 114 or bottom wall of the casing 111 and are provided adjacent their ends with collars 153 which are adapted to be engaged by the plates 154 which carry the rollers 155, which, in turn, engage the weights 74.

The forward end of each of the rods 147 is reduced and engages in a corresponding opening in the plate 154. The collar 153 is spaced at such a distance from the plate 154 as to permit the operation of the clutch 800 which corresponds to the clutch 66 in the construction previously described, and is substituted therefor, without affecting the operation of the clutch 100. This is accomplished by the provision of springs 156 which are interposed between the plates 154 and 157 of the clutch 800.

The operation of the over-drive or fourth speed device is as follows: On a further increase in the speed after the clutch 800 is in operation, the plates 154 are forced rearward against the collars 153 by the engagement of the rollers 155 with the cam surfaces 79 and this in turn will force the rod 147 rearwardly, further compressing the springs 156. This rearward movement of the rods 147 will cause the dogs 144 to press forwardly on the bearing 143 for operating the brake 100. This will lock the internal gear 121 to the sleeve 134 of the stationary casing 12—a. As the casing 39 continues to rotate, and with it the casing 111, the pinions 119 carried by the hub 115 will rotate therewith, and at the same time will be caused to rotate on their axes counterclockwise, due to their meshing with the now stationary ring gear 121. This in turn through the meshing of the pinions 117 with the gear 123, since they are spur gears, will drive the latter clockwise at a higher rate of speed than the casing 39. Since the clutch teeth 125 and 126 are in mesh, this will drive the driven shaft 128 at a higher speed than the driving shaft 13.

The clutch 530 and the clutch operating mechanism 610 are similar to and operate in the same manner as the corresponding clutch 53 and operating member 61 previously described.

It is thought from the foregoing taken in connection with the accompanying drawings that the construction and operation of our device will be apparent to those skilled in the art and that changes in size, shape, proportion and details of construction may be made without departing from the spirit and scope of the appended claims.

We claim as our invention:

1. In a change speed device for motor vehicles, a driving shaft, a driven shaft, change speed mechanism between said shafts, said mechanism comprising a pair of internal gears, a pair of pinions engaging said gears, a shaft on which said pinions are mounted, an over-running brake for holding one of said gears from rotating in a reverse direction, over-running clutch means for locking said pinions and for causing them to rotate together, the gear ratio between one of said gears and its meshing pinion being greater than that of the other gear and pinion, whereby the differential movement between said pinions and gears causes the rotation of said driven shaft in the same direction as that of said driving shaft but at a slower speed.

2. In a change speed transmission for motor vehicles, a driving shaft, a driven shaft, said driven shaft comprising a forward and a rear section, change speed mechanism for driving said driven shaft from said driving shaft, said mechanism comprising a rotatable casing, an internal gear secured to said casing, a gear support rotatably mounted within said casing, an internal gear mounted on said support, an over-running brake for preventing reverse rotation of said support, laterally extending members on said drive shaft, a shaft journaled in said members, pinions on said shaft engaging said gears, the gear ratio between the first-named gear and its engaging pinion being less than the gear ratio between the second-named gear and its engaging pinion, said pinions being connected together by an over-running clutch, and a speed controlled clutch between said casing and the rear section of said driven shaft whereby upon the rotation of said driving shaft, the rear section of said driven shaft will be driven in the same direction as, but at a slower speed than, said driving shaft.

3. In a change speed device for motor vehicles, a driving shaft, a driven shaft, means including a forward, a rearward, and an intermediate set of internal gears and pinions between said shafts for driving said driven from said driving shaft, the gear ratios of said sets being different, means for preventing rotation of the forward gear, means including an over-running clutch for locking the pinions of said forward and intermediate sets together whereby the differential movement of said gears and pinions when operated by said driving shaft will cause a low speed movement of said driven shaft, and means including a speed responsive clutch for causing a differential movement between said first and third sets for driving said driven shaft at an intermediate speed.

4. In a change speed device for motor vehicles, a driving shaft, a driven shaft, means including a forward, a rearward, and an intermediate set of internal gears and pinions between said shafts for driving said driven from said driving shaft, the gear ratios of said sets being different, means for preventing rotation of the forward gear, means for locking the pinions of said forward and intermediate sets together whereby the differential movement of said gears and pinions will cause a low speed movement of said driven shaft when operated by said driving shaft, means including an overrunning clutch and a centrifugal clutch whereby the differential movement between said first and third sets will cause said driven shaft to be driven at an intermediate speed, and automatic means for locking all of said gears and pinions together when said driven shaft exceeds a predetermined speed.

5. In a change speed mechanism for use in motor vehicles, a driving shaft, a section driven shaft, the sections of said driven shaft being in axial alinement with said driving shaft, means including a clutch and a set of internal gear and pinion mechanism for operating one section of said driven shaft from said driving shaft at one predetermined speed ratio, means including another clutch and another set of internal gear and pinion mechanism for operating the same section of said driven shaft from said driving shaft, to the exclusion of the other section of said driven shaft, at another speed ratio, means including speed responsive elements for automatically operating said last named clutch for changing the speed ratio between said driving shaft and one of said driven shaft sections, and means including said second-named set of gear and pinion mechanism and a set of idler gears for operating the other section of said driven shaft in the opposite direction.

6. A change speed mechanism for use in a self-propelled vehicle comprising a driving shaft and a driven shaft, means including a plurality of clutch members, a plurality of speed reducing gears including internal gears and pinions continually in mesh for operating said driven shaft from said driving shaft, said clutch members having cam engaging elements thereon, springs for holding said members in inoperative position, and means including weight members having cam faces thereon engaging elements for operating said clutches for automatically changing the speed ratio between the driving and driven shafts without the aid of torque mechanism.

7. In a change speed device, a driving shaft, a driven shaft, change speed mechanism between said shafts, said mechanism comprising two sets of clutch members and three sets of permanently meshing internal gears and cooperating pinions for driving the driven shaft forwardly at a plurality of different speeds, cam engaging elements on said clutch members, springs arranged parallel with said driving and driven shafts for holding said clutch members in inoperative position, and means including a single set of radially movable centrifugally operated members having cam surfaces for engaging said elements for automatically operating said clutches for changing the speed ratio of said shafts.

8. In a change speed device for use in motor vehicles, a driving shaft, a driven shaft, change speed mechanism for driving said driven shaft from said driving shaft at a plurality of speed ratios, said mechanism comprising two set of gears, pinions and clutch members, means including a single set of weights for operating said clutch members when the angular velocity of said weights exceeds predetermined amounts for causing said two sets of gears and pinions to drive said driven shaft from said driving shaft at two different speed ratios, another set of gear and pinions, a brake member associated with said last-named gear and pinions for causing relative movement therebetween when said brake is operated, and means operable by said weights when the angular velocity of the same reaches a predetermined amount for operating said brake for driving said driven shaft from said driving shaft at a higher speed than said driving shaft.

9. In a change speed device, a driving shaft, a casing within which said shaft is journaled, a gear support, a housing rotatable about said shaft, an intermediate internal gear fixed to the interior of said housing, a forward and a rear gear support, forward and rear internal gears secured to said supports, respectively, an overrunning brake for locking said forward support to said housing, a plurality of stub shafts, forward and rear pinions rigidly mounted on each of said shafts and meshing with said forward and rear gears, respectively, intermediate pinions rotatable on said shafts and meshing with said intermediate gears, overrunning clutch mechanism between said forward and intermediate pinions for driving said housing from said driving shaft at a reduced speed, means for rotating said driven shaft from said housing, a set of clutch members connected to said rear gear support and to said housing, means including radially movable weights for operating said last-named clutch members when the angular velocity of said weights rises above a predetermined amount for operating said driven shaft from said driving shaft at an intermediate speed ratio, means including a second set of clutch members operable by said weights when the speed of the latter exceeds a predetermined amount for driving said driven shaft from said driving shaft at the same speed, and means including a set of brake members operable by said weights when the speed of the latter exceeds a predetermined amount for driving said driven shaft from said driving shaft at a higher speed than the driving shaft.

10. In a change speed device, a driving shaft, a driven shaft, speed controlled change speed mechanism between said shafts for driving said driven shaft from said driving shaft at a plurality of speeds, said mechanism comprising a casing, a gear support, a plurality of internal gears within said casing, one of said gears being fixed to the casing, another of said gears being mounted on the gear support, a plurality of shafts rotatable with said driving shaft, pinions on each shaft in mesh with said gears, and a plurality of overrunning clutches for releasably locking the pinions of each shaft together and overrunning brake means for locking said casing against rotation in a direction opposite to the direction of rotation of the driving shaft.

11. In a change speed device for motor vehicles, a driving shaft, a driven shaft, a set of internal gear and cooperating pinion mechanisms associated with each shaft, the gear ratio of said set associated with the driving shaft being lower than that associated with said driven shaft, and means including a clutch and centrifugally operated mechanism for operating said clutch for causing said pinions to rotate at the same angular velocity whereby the movement between said gears and pinions will cause said driven shaft to be rotated at a slower rate of speed than said driving shaft.

12. In a change speed device for use in motor vehicles, a drive shaft, a driven shaft, change speed mechanism for driving said driven shaft from the driving shaft at low, intermediate and high speeds, said mechanism comprising a rotatable housing, clutch members for clutching said housing to the driven shaft, an internal gear rotatable with the housing, a first and second gear support, an overrunning brake means for preventing reverse movement of the first gear support, clutch members for clutching said second gear support to said housing, an internal gear on each support, stub shafts carried by said driving shaft, each stub shaft having thereon a pinion for each gear, the gear ratio of each gear and pinion being different, two of said pinions being connected together by an overrunning clutch, and means comprising radially movable centrifugally operated members for operating said clutch members for causing said driven shaft to travel at a different speed or at the same speed as said driving shaft.

13. In a change speed device, a driving shaft, a driven shaft, change speed mechanism between said shafts, said mechanism comprising means including a plurality of sets of gears and pinions, two sets of clutch means associated with said sets of gears and pinions, a set of slidably movable centrifugally operated members for automatically operating said mechanism for changing the speed ratio between said shafts without the aid of torque operated mechanism, a brake member, and means operable by said centrifugally operated members when their angular velocity reaches a predetermined amount for operating said brake member for driving said driven shaft at a higher speed than said driving shaft.

14. In a change speed device, a driving shaft, a driven shaft, change speed mechanism between said shafts, said mechanism comprising means including a plurality of sets of internal gears and pinions, and two sets of clutch means associated with said sets of gears and pinions, a set of slidably movable centrifugally operated members for automatically operating said mechanism for changing the speed ratio between said shafts without the aid of torque operated mechanism, and means including brake mechanism operable by said members when the angular velocity of the same reaches a predetermined amount for operating said brake for driving said driven shaft from said driving shaft at a higher speed than said driving shaft.

JOSEPH M. HALL.
HERBERT E. TUCKER.